US000001448H

United States Statutory Invention Registration [19]

[11] Reg. Number: H1448

Goode, Jr.

[43] Published: Jun. 6, 1995

[54] HIGH PRECISION TRANSFER LAMINATION MANDREL

[75] Inventor: Herbert S. Goode, Jr., Buview, Wash.

[73] Assignee: The United States of America as represented by the Secretary of the Army, Washington, D.C.

[21] Appl. No.: 934,079

[22] Filed: Aug. 24, 1992

[51] Int. Cl.[6] ..... B32B 15/18

[52] U.S. Cl. ..... 428/552; 428/554; 428/555; 428/615; 428/681; 428/682; 428/684; 428/685

*Primary Examiner*—Donald P. Walsh
*Assistant Examiner*—Chrisman D. Carroll
*Attorney, Agent, or Firm*—Fred M. Bush; Hugh P. Nicholson

[57] ABSTRACT

A high precision transfer lamination plate/mandrel is fabricated in a sandwich construction design wherein an inner core is constructed of a low coefficient of thermal expansion (CTE) comprised of an iron-nickel alloy core member (e.g., Kovar or Invar) with stainless steel cladding on each side of the core member. The stainless steel is selected from AISI type 302, 304, or 316. The stainless steel cladding outer surface of the top and bottom plate to which an electroplated copper foil circuitry is applied must be free of pits, scratches, and defects so as to yield a continuous circuitry satisfactory for military electronics. A matched (CTE) of the transfer lamination plate/mandrel with a composite material to which the electronic circuitry is transferred results in adherence of the copper circuitry minimally to the plate/mandrel to avoid blistering and enables the transfer to be achieved without distortion of circuitry features due to CTE mismatch. The composite material to which the electronic circuitry is laminated is an aramid-/epoxy prepreg fabric (e.g., Kevlar/epoxy prepreg fabric).

2 Claims, 1 Drawing Sheet

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

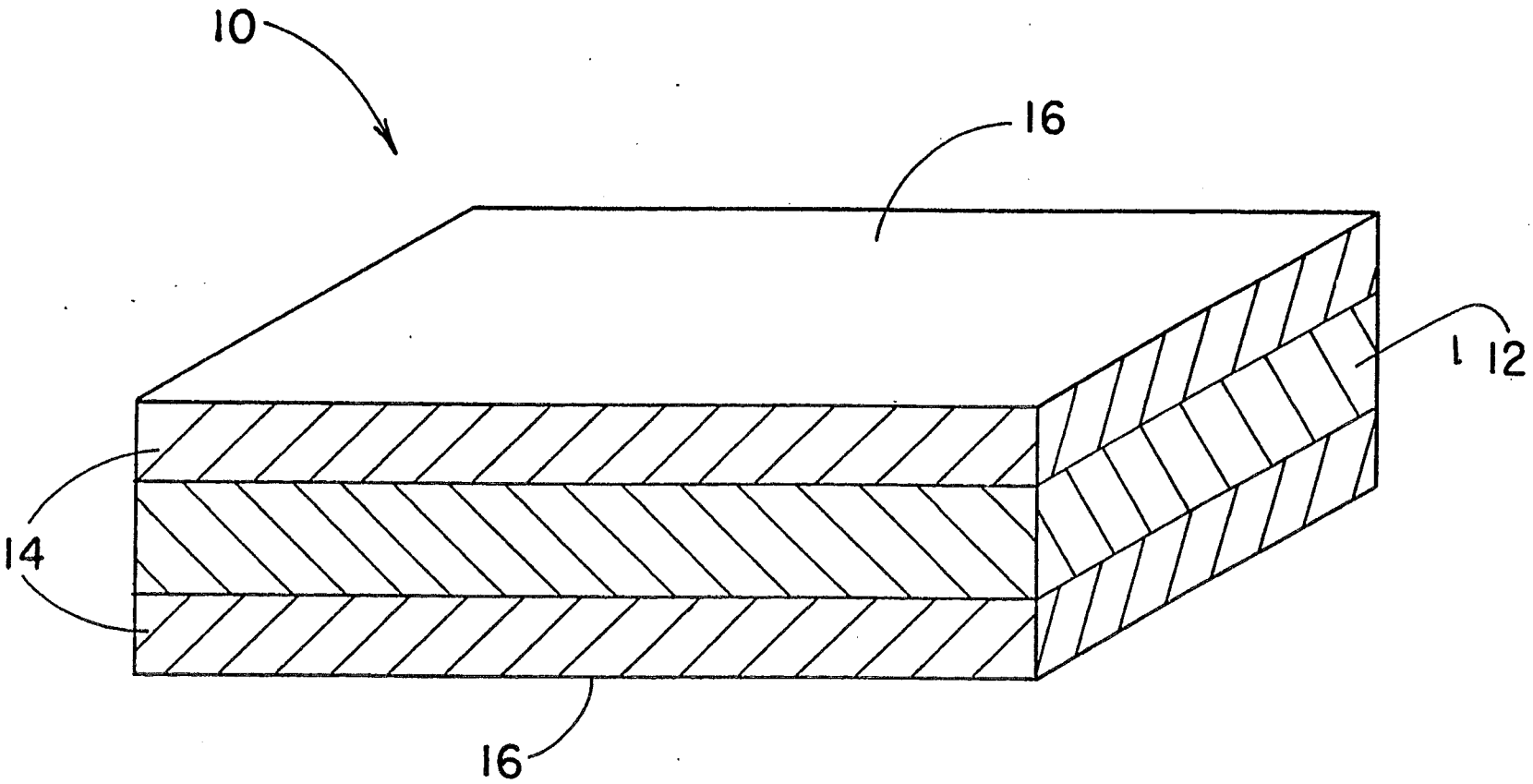
10
14
16
16
12

HIGH PRECISION TRANSFER LAMINATION MANDREL

DEDICATORY CLAUSE

The invention described herein may be manufactured, used, and licensed by or for the Government for governmental purposes without the payment to me of any royalties thereon.

BACKGROUND OF THE INVENTION

The fabrication of precisely located and precisely dimensional electronic circuitry is a desirable feature which is needed, particularly for multilayer electronic circuitry construction.

The prior art techniques and circuitries in the field of the invention are commonly referred to as transfer-lamination circuitry, semi-additive circuitry, and additive circuitry.

The current "Transfer Lamination" process uses a 300-series stainless steel plate upon which circuitry is electroformed, then laminated to a composite material, (e.g., KEVLAR/epoxy prepreg fabric). When peeled away, the resulting laminate has a permanent "curl" and circuitry which is distorted in the X-Y plane. The described effects are major obstacles to multilayer circuitries construction. These effects are due to the coefficient of thermal expansion (CTE) mismatch between the stainless steel substrate and the composite materials.

SUMMARY OF THE INVENTION

A stainless steel-cladding of a low coefficient of thermal expansion (CTE) core member of nickel-iron alloy (e.g., KOVAR, iron base alloy containing Ni-Co-Mn, or INVAR, Fe-Ni-C-alloy) provides a high precision transfer lamination plate/mandrel, which is matched to the coefficient of thermal expansion (CTE) of the composite material to which circuitry is transferred from the stainless steel plate of the mandrel. Because of the matched CTE of the plate/mandrel and the composite material, distortion is minimized at all lamination temperatures. The outer surface of the stainless steel-cladding should be free of pits, scratches, and defects so as to yield a continuous circuitry satisfactory for military electronics. The stainless steel-cladded mandrel is annealed prior to being provided with a layer of electroplated copper so that the electroplated copper does not "blister" but adheres minimally so that the layer of copper can be peeled away as a smooth, continuous foil during transfer to the composite material.

BRIEF DESCRIPTION OF THE DRAWING

The figure of the drawing depicts a sectional view of a transfer lamination plate/mandrel 10 having a core member 12 in a sandwich construction design with stainless steel cladding members 14 having surfaces 16 free of pits, scratches, and defects on each side of the core.

DESCRIPTION OF THE PREFERRED EMBODIMENT

A transfer lamination plate/mandrel is constructed in a sandwich construction design wherein stainless steel cladding plates (e.g., AISI types 304, 316, or 302) are in intimate contact as the outside members in combination with a low-expansion, iron-base alloy employed as the core member having a top and bottom surface in intimate contact with said stainless steel cladding plates.

The above described design arrangement provides a matched coefficient of thermal expansion (CTE) of the transfer lamination plate/mandrel with a composite material to which an electroform circuitry is transfer laminated. The composite material is constructed of an aramid/epoxy prepreg fabric. The aramid is commercially available as Kevlar from Du Pont de Nemours and Company. The low expansion nickel/iron alloy, employed as the core, is selected from KOVAR, low coefficient of thermal expansion; iron-base alloy comprising with 28–30% nickel, 15–18% cobalt, and fractional percentages of manganese, or INVAR, an iron-nickel alloy of Ciba-Geigy Co., Invar, a low coefficient of thermal expansion iron-nickel alloy, is comprised of 63.8% iron, 36% nickel, and 0.2% carbon.

In further reference to the figure of the drawing, the high precision transfer lamination plate/mandrel 10 is depicted in a sandwich construction design which comprises stainless steel cladding members 14 and a core member 12 of a low coefficient of thermal expansion (CTE) nickel/iron alloy 12. The external stainless steel top and bottom plate surfaces 16 must be free of pits, scratches, and defects so as to yield a continuous circuitry satisfactory for military electronics. Prior to use the plate mandrel is annealed to provide a uniform temperature surface for receiving a layer of electroplated copper which adheres minimally so that the layer of copper can be peeled away as a smooth, continuous foil during transfer to the composite material.

Table I lists heat resisting steels AISI types suitable for use a cladding plates.

TABLE I

| | ELEMENT NOMINAL COMPOSITION, PERCENT AUSTENITIC STEELS | | | | | |
|---|---|---|---|---|---|---|
| AISI Type | C | Mn, max | Si, max | Cr | Ni | Other[a] |
| 301 | 0.15 max | 2.00 | 1.00 | 16.00–18.00 | 6.00–8.00 | |
| 304 | 0.08 max | 2.00 | 1.00 | 18.00–20.00 | 8.00–12.00 | |
| 316 | 0.08 max | 2.00 | 1.00 | 16.00–18.00 | 10.00–14.00 | 2.00–3.00 Mo |

[a]Other elements in addition to those shown above are as follows: phosphorus is 0.045 percent max; sulphur is 0.030 percent max; and balance percent is iron.

I claim:

1. A high precision transfer lamination plate/mandrel fabricated in a sandwich construction and method coefficient of thermal expansion with a composite material to which an electronic circuitry is transfer laminated, said high precision transfer lamination plate/mandrel comprising: P1 (i) an iron-nickel allow core member having a low coefficient of thermal expansion in the form of a plate; and P1 (ii) heat-resisting stainless steel cladding plates free of pits, scratches, and defects positioned in intimate contact on a top surface and a bottom surface of said core member to form said high precision transfer lamination plate/mandrel having a matched coefficient of thermal expansion with a composite material to which an electronic circuitry is transfer laminated.

2. The high precision transfer lamination plate/mandrel as defined in claim 1 wherein said iron-nickel alloy core member is selected from an iron-base alloy comprised of 28–30% nickel, 15–18% cobalt, fractional percentages of manganese, and balance iron and an iron-nickel alloy comprised of 63.8% iron, 36% nickel, and 0.2% carbon, and wherein said heat-resisting stainless steel cladding plates are selected from a stainless steel defined by austenitic steels having AISI number 301, 304, and 316 as specifically defined in Table I set forth below as follows:

TABLE I

| | ELEMENT NOMINAL COMPOSITION, PERCENT | | | | | |
|---|---|---|---|---|---|---|
| AISI Type | C | Mn, max | Si, max | Cr | Ni | Other[a] |
| 301 | 0.15 max | 2.00 | 1.00 | 16.00–18.00 | 6.00–8.00 | |
| 304 | 0.08 max | 2.00 | 1.00 | 18.00–20.00 | 8.00–12.00 | |
| 316 | 0.08 max | 2.00 | 1.00 | 16.00–18.00 | 10.00–14.00 | 2.00–3.00 Mo |

[a]phosphorus is 0.045 percent maximum; sulphur is 0.030 percent maximum; and balance of steel, iron.

* * * * *